United States Patent

Chomik et al.

Patent Number: 6,138,710
Date of Patent: Oct. 31, 2000

[54] VENT DISC FOR BABY BOTTLE AND METHOD AND APPARATUS FOR MANUFACTURE THEREOF

[75] Inventors: Richard S. Chomik, Garwood, N.J.; Joseph Clark, Naugatuck, Conn.; Francis X. Manganiello, Pompton Plains, N.J.

[73] Assignee: Playtex Products, Inc., Westport, Conn.

[21] Appl. No.: 09/209,070

[22] Filed: Dec. 10, 1998

Related U.S. Application Data

[60] Provisional application No. 60/069,083, Dec. 10, 1997.

[51] Int. Cl.[7] ............ F16K 21/04; F16K 15/14; B65D 55/02
[52] U.S. Cl. ............... 137/512.15; 137/849; 215/11.5
[58] Field of Search ............... 137/512.15, 849; 215/11.5

[56] References Cited

U.S. PATENT DOCUMENTS

| | | |
|---|---|---|
| 357,439 | 2/1887 | Wheelock . |
| 557,199 | 2/1997 | Neidlinger . |
| 921,387 | 5/1909 | Etter . |
| 2,060,212 | 11/1936 | Herstein . |
| 2,084,099 | 6/1937 | Maccoy . |
| 2,365,947 | 12/1941 | Ganson . |
| 2,774,500 | 12/1956 | Budiani . |
| 2,982,432 | 5/1961 | Mehl . |
| 3,134,495 | 5/1964 | Carbonel . |
| 3,718,140 | 2/1973 | Yamauchi . |
| 3,883,025 | 5/1975 | Jemmett . |
| 4,010,861 | 3/1977 | Welten . |
| 4,401,224 | 8/1983 | Alonso . |
| 4,545,491 | 10/1985 | Bisgaard et al. . |
| 4,685,577 | 8/1987 | Chen . |
| 4,723,668 | 2/1988 | Cheng . |
| 4,865,207 | 9/1989 | Joyner et al. . |
| 4,928,836 | 5/1990 | Wu et al. . |
| 4,993,568 | 2/1991 | Morifuji et al. . |
| 5,071,017 | 12/1991 | Stull . |
| 5,101,991 | 4/1992 | Morifuji et al. . |
| 5,215,312 | 6/1993 | Knappe et al. . |
| 5,339,971 | 8/1994 | Rohrig . |
| 5,431,290 | 7/1995 | Vinciguerra . |
| 5,433,353 | 7/1995 | Flinn . |
| 5,499,729 | 3/1996 | Greenwood . |
| 5,544,766 | 8/1996 | Dunn et al. ............ 215/11.1 |
| 5,601,199 | 2/1977 | Marty . |
| 5,607,074 | 3/1997 | De Gennaro . |

FOREIGN PATENT DOCUMENTS

| 2238729 | 6/1991 | United Kingdom . |
| WO90/07320 | 7/1990 | WIPO . |

Primary Examiner—Denise L. Ferensic
Assistant Examiner—Ken B. Rinehart
Attorney, Agent, or Firm—Ohlandt, Greeley, Ruggiero & Perle, LLP

[57] ABSTRACT

A vent disc for a container is provided. The vent disc has a concavely curved domed central panel with a plurality of perforations extending therethrough along radii that form the concave curvature of the domed central panel. The domed central panel can have a plurality of upwardly extending depressions therein that leave residual central panel above the depressions. The depressions have center lines that are coincident with radii that form the concave curvature of the domed central panel. The perforations extend through the residual of central panel material. Methods and apparatus are also provided for forming the vent disc with the perforations and depressions therein.

33 Claims, 7 Drawing Sheets

VENT DISC FOR BABY BOTTLE AND METHOD AND APPARATUS FOR MANUFACTURE THEREOF

RELATED APPLICATIONS

This application is related to copending U.S. patent application Ser. No. 08/923,372, filed Sep. 3, 1997, and claims the priority of U.S. Provisional Application No. 60/069,083, filed on Dec. 10, 1997, the disclosures of which are incorporated herein by reference.

BACKGROUND OF THE INVENTION

1. Field of the Invention

The present invention relates to vent discs that alleviate the vacuum created in containers, such as infant feeding bottles, during feeding. The present invention also relates to methods and apparatus for manufacturing the vent discs.

2. Description of Related Art

Baby feeding bottles having venting means designed to allow air to flow into the bottle to alleviate the vacuum created in the bottle during feeding are known. Among these, bottles having bottom-mounted perforated elastomeric diaphragms, or vent discs, have proven to be effective at alleviating the vacuum, while preventing leakage.

SUMMARY OF THE INVENTION

It is an object of the present invention to provide an improved vent disc that alleviates the vacuum pressure created in an infant feeding bottle during feeding.

It is another object of the present invention to provide an improved vent disc that does not leak when a liquid is in contact with the vent disc.

It is yet another object of the present invention to provide methods for making an improved vent disc.

It is still another object of the present invention to provide apparatus for making an improved vent disc.

The above objects of the invention are provided by, and the present invention includes, a vent disc with an upwardly concavely curved domed portion having a plurality of perforations extending therethrough, the perforations extending along radii that form the concave curvature of the domed portion. The vent disc can have a plurality of upwardly extending depressions therein, a plurality of residuals of a central panel with each residual above a separate one of each of the plurality of depressions, and a plurality of the perforations extending through the residuals. The depressions have center lines that are coincident with radii of curvature that form the concave curvature of the domed portion, and the perforations extend along the center lines of the depressions.

The present invention also includes a method of forming a plurality of perforations in an upwardly concavely curved domed portion of a vent disc. The method comprises forming the plurality of perforations along radii that form the concave curvature of the domed portion.

The present invention further includes a method of forming a plurality of perforations in the vent disc, by forming a plurality of upwardly extending depressions in the undersurface of the domed portion while leaving a residual of domed portion above each depression. The depressions are formed on centerlines coincident with radii that form the concave curvature of the domed portion, and form a plurality of perforations through the residuals. The perforations are formed along the centerlines of the depressions.

The present invention also includes apparatus for forming a plurality of perforations in a vent disc. The apparatus comprises a plurality of elongated means for piercing the domed portion of the vent disc to form the perforations, each of the plurality of elongated piercing means having a longitudinal central axis, means for mounting the plurality of elongated piercing means so that their central axes are coincident with the radii of curvature that form the domed portion of the vent disc, means for holding said vent disc and for supporting the domed portion, and means for driving the piercing means along the radii of curvature and through the domed portion of the vent disc to form the perforations.

BRIEF DESCRIPTION OF THE DRAWINGS

FIGS. 5 through 7A, in combination, show an alternative piercing die assembly of the present invention;

DETAILED DESCRIPTION OF THE INVENTION

Figure 1:
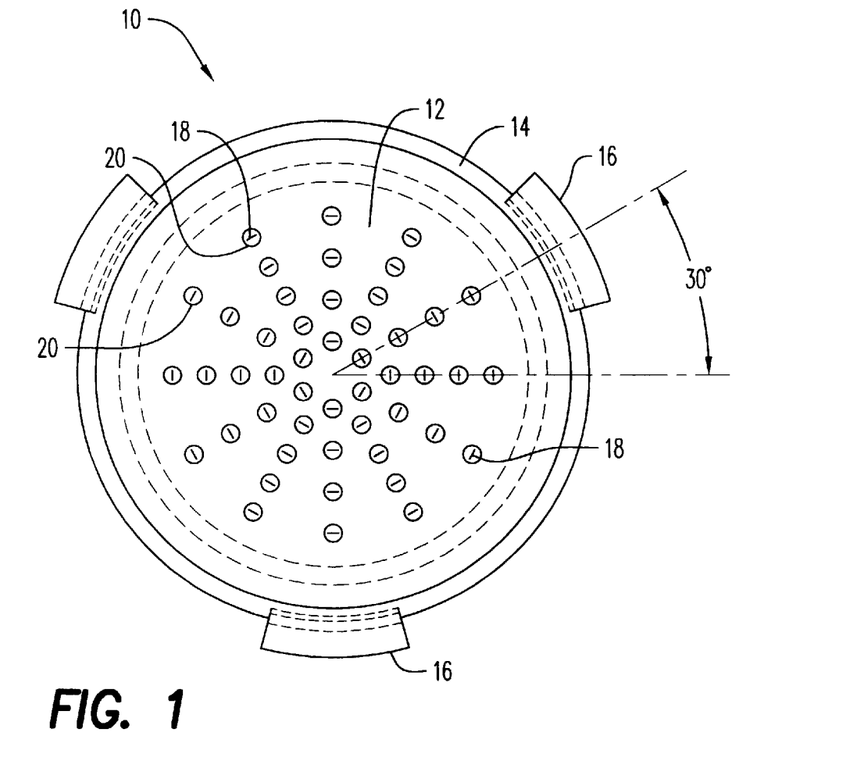
FIG. 1 is a top view of the improved vent disc of the present invention.
Figure 2:
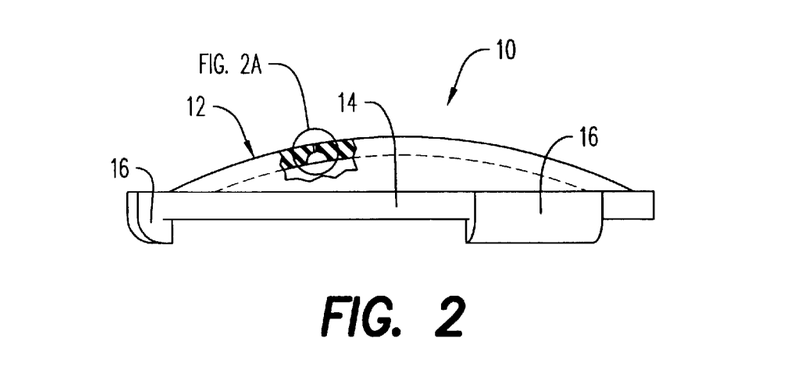
FIG. 2 is a side view, with portions in vertical section, showing the vent disc of FIG. 1.

Referring to the Figures and, in particular, FIGS. 1 and 2, there is shown a preferred vent disc of the present invention, generally referred to by reference numeral 10. Vent disc 10 has a curved domed central panel 12, a rim 14, and a plurality of peripheral tabs 16, preferably three. The central panel 12 is concavely curved in the direction from where liquid is emitted, namely the upward direction. The plurality of tabs 16 are preferably integral to central panel 12, and are adapted to lock and hermetically seal vent disc 10 into a corresponding number of slots, preferably three (not shown) in the periphery of an end cap of an infant feeding bottle (not shown).

Central panel 12 of vent disc 10 has a plurality of resealable apertures or perforations, preferably elongated slits 18, therethrough. Slits 18 preferably extend along radii that form the concave curvature of central panel 12. Slits 18 permit air to flow through them and into the feeding bottle when a partial vacuum is created therein during feeding.

Figure 2A:
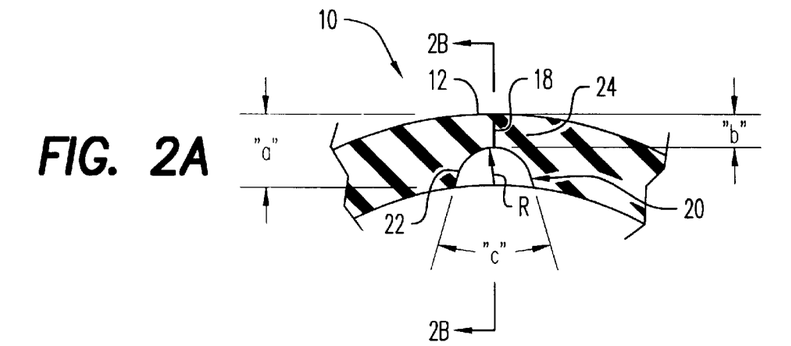
FIG. 2A is an enlarged view, with portions broken away, of the encircled portion of the vent disc of FIG. 2.
Figure 2B:
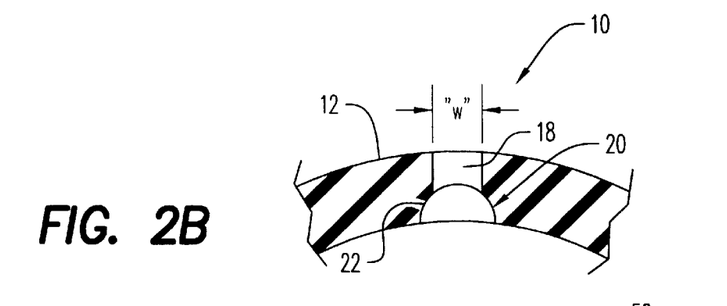
FIG. 2B is an enlarged view, with portions broken away, taken along line 2B—2B of FIG. 2A.

As shown in FIG. 2A, under and aligned with each slit there is a pocket or depression 20 formed into the undersurface of central panel 12. Depression 20 is preferably dish-shaped, recessed, upwardly concave, and circular or hemispherical in shape. Preferably, vent disc 10 is made of a slightly opaque, mostly transparent elastomeric material. If transparent, each depression 20 is shown in FIG. 1 as an uninterrupted solid circular line. Depressions 20 have centerlines that are coincident with radii of curvature that form the concave curvature of central panel 12. Thus, slits 18 extend along and are coincident with the centerlines of depressions 20.

Depressions 20 and slits 18 can be arranged in any suitable desired pattern. As few as two depressions to as many depressions as reasonably may be permitted in the available surface area of vent disc 10 can be used. In a preferred embodiment, the number of slits 18 is between about 35 to 60.

As shown in FIG. 1, slits 18 preferably are arranged in a starburst pattern having a series of 12 radial extensions equally circumferentially angularly spaced 30° from each other and each having three or four equally radially spaced individual slits 18 and underlying depressions 20. It has been found that this arrangement of slits 18 provides optimal airflow. In this pattern, preferably there are about 48 slits. For this number of slits 18, the preferred range of slit width is from about 0.040 to about 0.080 inches, more preferably from about 0.058 to about 0.062 inches. The most preferred slit width is about 0.060 inches. If the width of slits 18 is increased, preferably the number of total slits is decreased. Conversely, if the width of individual slits 18 is decreased, the number of slits is increased to maintain optimum functioning.

With reference to FIG. 2A, the thickness "a" of central panel 12 of vent disc 10 should range from about 0.030 inches to about 0.100 inches, with a more preferred range of about 0.050 to about 0.060 inches. In a most preferred embodiment, the thickness of central panel 12 is about 0.055 inches. Depressions 20 most preferably are about 0.025 inches deep or thick. Therefore, the thickness "b" of the remainder or residual 24 of central panel 12 of vent disc 10 above depression 20 most preferably is about 0.030 inches. Residual 24 is preferably about 0.010 inches to about 0.090 inches thick, more preferably about 0.025 inches to about 0.035 inches thick. Preferably, the arcuate inner portions of depressions 20 are formed by a radius of curvature R of 0.030 inches, and their side walls 22 are disposed at an angle "c" of 60°. Depressions 20 can be, among other shapes, conical or cylindrical, and they can have a flat top portion. After residual 24 is pierced to provide slit 18, and the piercing element is removed, slit 18 closes itself so that there is no leakage of water or fluid. Material is not removed from the area of residual 24 during the piercing process.

Vent disc 10 can be made of any suitable polymeric or thermoset material, such as thermoplastics, elastomers, thermoset rubbers, silicones, and the like. Combinations of these materials may also be used. The material of vent disc 10 can have a hardness of from about 40 to about 80 durometers. Preferably its hardness is about 60 durometers. Preferably, vent disc 10 is made of thermoset rubber, most preferably a silicone. The rubber must be virtually 100% cured. Curing affects the necessary venting characteristics of the slit. If the thermoset rubber is virtually 100% cured, the cut or pierced slit 18 in the residual of central panel 12 above each depression 20 will stick together and may reseal as vent disc 10 is heated.

Several methods may be employed for forming vent discs 10 of the present invention. The methods include conventional molding and liquid injection molding techniques.

In conventional molding, molding is preferably done through a heating and compression process. A blank (slug) of silicone or other material is placed in the cavity of the compression mold, and heat is applied to the mold as it closes on the slug of material. The slug of material takes on the shape of the cavity, which in this case is that of vent disc 10. The silicone or other material of vent disc 10 is given sufficient time to cure or set. After curing, the cavity is opened and a molded vent disc 10 having tabs 16 and depressions 20 extending into the undersurface of central panel 12 is removed from the mold. The molded vent disc 10 preferably does not have slits. Excess edge trim and/or flashing that is generated during the molding process is removed from molded vent disc 10.

Liquid injection molding (LIM) is the preferred process for forming vent disc 10. In LIM, the silicone or other material is injected in a molten state under pressure through an injection nozzle into an injection mold. The LIM process is a continuous process. The advantages of using the LIM process are reduced cycle times, virtually instantaneous curing of the rubber, high purity, high consistency, and high quality imbued in the fabricated parts. LIM parts can be used immediately once they are taken out of the mold. Moreover, the LIM process reduces the amount of waste generated by the molding process. In the LIM process, there is no excess trim or flash. Using a LIM process, vent disc 10 having tabs 16 and depressions 20, is formed in the injection mold.

Preferably, the molding process does not form perforations or slits 18 in central panel 12. Preferably, piercing of molded vent disc 10 is performed in a separate operation. Thus, molded vent disc 10 is transferred to a piercing die assembly in which slits 18 are cut through residual 24 of the vent disc.

Figure 3:
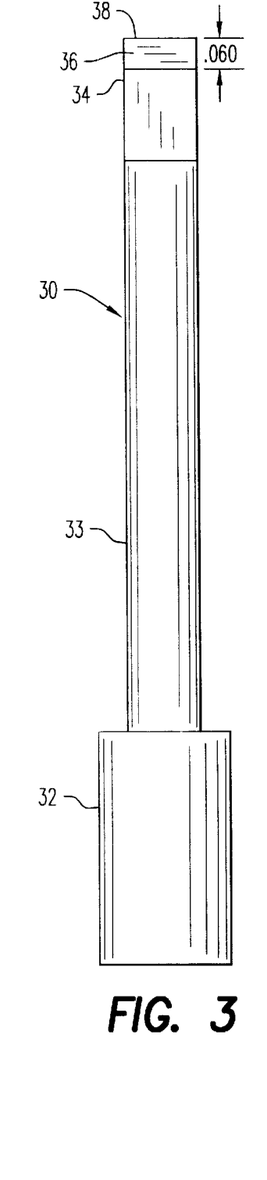
FIG. 3 is a front view of a piercing element for forming slits in a vent disc.
Figures 3A, 3C, 3D, 3E:
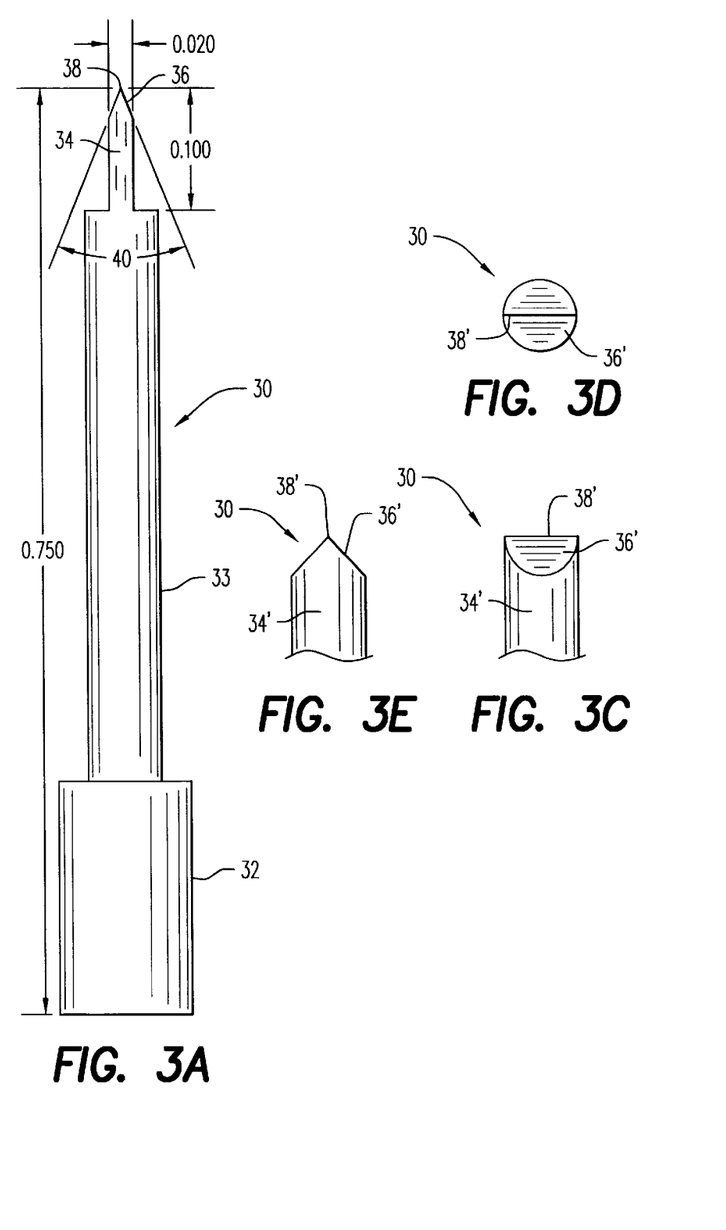
FIG. 3A is a side view of the piercing element of FIG. 3.
FIG. 3C is a front view, with portions broken away, of an alternative embodiment of the blade of the piercing element of FIG. 3.
FIG. 3D is a top view of the piercing blade of FIG. 3C.
FIG. 3E is a side view of the piercing blade of FIG. 3C.
Figure 3B:
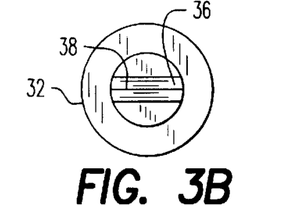
FIG. 3B is a top view of the piercing element of FIG. 3.

FIGS. 3 through 3B show structure for piercing domed central panel 12 to form perforations or slits 18 therein. These Figures show a piercing element 30 having a base 32, a shaft 33, and a rectangular piercing blade 34 having angled surfaces 36 that form a sharp elongated cutting or piercing edge 38. Blade 34 preferably has either a knife-like or an arrow shaped edge as shown in FIG. 3A. However, pin-type piercing elements may also be used. The preferred blade 34 is approximately 0.060 inches long. That is, its vertical height is about 0.060 inches.

FIGS. 3C through 3E show an alternative embodiment of a cutting blade of a piercing element 30. More particularly, these Figures show a cylindrical blade 34' having angled surfaces 36' that form cutting or piercing edge 38'. The angled surface 36 is preferably arcuate.

Figure 4:
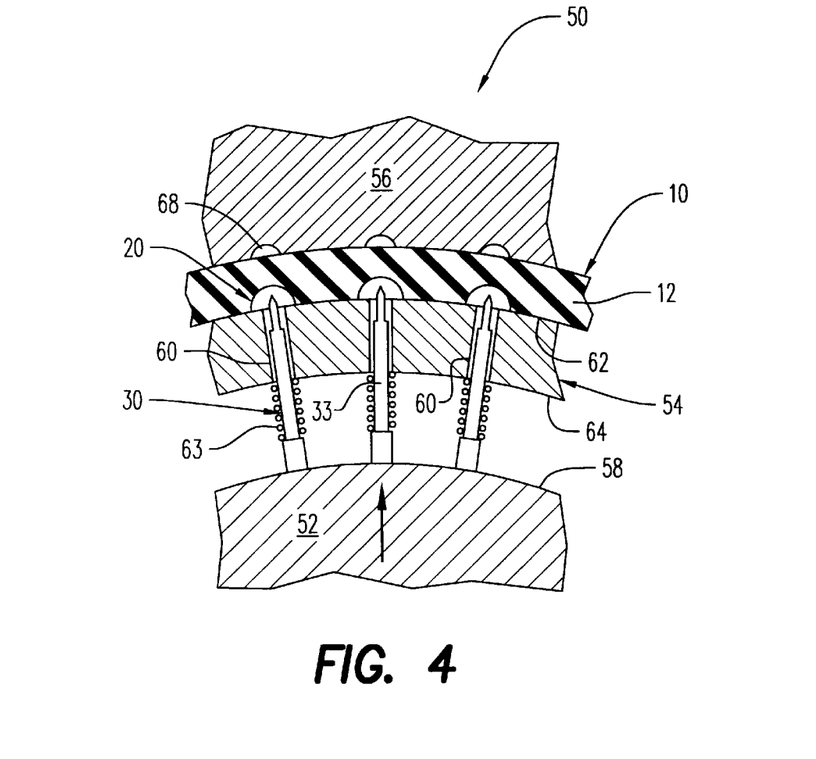
FIG. 4 is a front view, with portions broken away, of a preferred piercing die assembly of the present invention, for forming perforations in the vent disc of FIG. 1.

FIG. 4 shows a preferred embodiment of a piercing die assembly of the present invention, 50, for piercing and forming slits 18 in central panel 12 of vent disc 10. More particularly, FIG. 4 shows that die assembly 50 is comprised of a lower, vertically reciprocal mandrel 52, a fixed core or piercing die 54, a vertically movable backstop 56, and a plurality of piercing elements 30. Mandrel 52 and piercing die 54 are preferred structures for mounting piercing elements 30 so that their central axes coincide with radii of curvature that form domed central panel 12 of vent disc 10. Thus, mandrel 52 has an arcuate upper surface 58 formed by a radius of curvature that corresponds to that of central panel 12 of vent disc 10. Piercing elements 30 are mounted, preferably rest, on upper surface 58 of mandrel 52. The upper portion of each shaft 33 is disposed in a slot 60 extending angularly through piercing die 54 preferably so that edges 38 of blades 34 reside just below upper surface 62 of piercing die 54. Compression or coil springs 63 are concentrically axially mounted on shafts 33 of piercing elements 30, between undersurface 64 of piercing die 54 and bases 32 of piercing elements 30. Upper and lower surfaces 62, 64 of piercing elements 30 and lower surface 66 of backstop 56 are arcuate and their respective radii of curvature, i.e. their curvatures, correspond to that of upper surface 58 of mandrel 52. Lower surface 66 of backstop 56 has a plurality of upwardly extending grooves or reliefs 68 formed therein for accepting override of the free ends, i.e., the blades, of piercing elements 30. Piercing die 54 is preferably made of hardened steel. Backstop 56 is preferably made of nylon to protect blades 34, 34' of piercing elements 30, 30'. Nylon would break before blades 34, 34' of any piercing elements 30, 30' would break.

In operation, central panel 12 of vent disc 10 is placed on piercing die 54 and held between it and backstop 56. Mandrel 52 is driven vertically upward by suitable conventional structure (not shown) thereby driving piercing elements 30 through slots 60 (one shown without a piercing element therein), through depressions 20 and through residual 24 of central panel 12 to form slits 18 fully through residual 24. Piercing elements 30 are driven along radii of curvature that form central panel 12 of vent disc 10. Blades 34 are driven completely through central panel 12 and into reliefs 68 of backstop 56. During the upward movement of mandrel 52, springs 63 are compressed. Once slits 18 are formed, mandrel 52 is retracted downward, springs 68 uncoil, and biased piercing elements 30 are withdrawn downward with mandrel 52.

Due to the corresponding arcuate shapes of upper surface 58 of mandrel 52, upper surface, 62 of piercing die 54, and central panel 12 of vent disc 10, and that all piercing elements rest on upper surface 58 in die assembly 50, all piercing is effected in directions perpendicular to the particular surface portion of domed central panel 12 being or to be pierced. Since each slit 18 is perpendicular to the surface of central panel 12 that is being slit, the height of most slits through residual 24 is shorter than if slits were in a direction non-perpendicular to the surface being slit.

Figure 5:
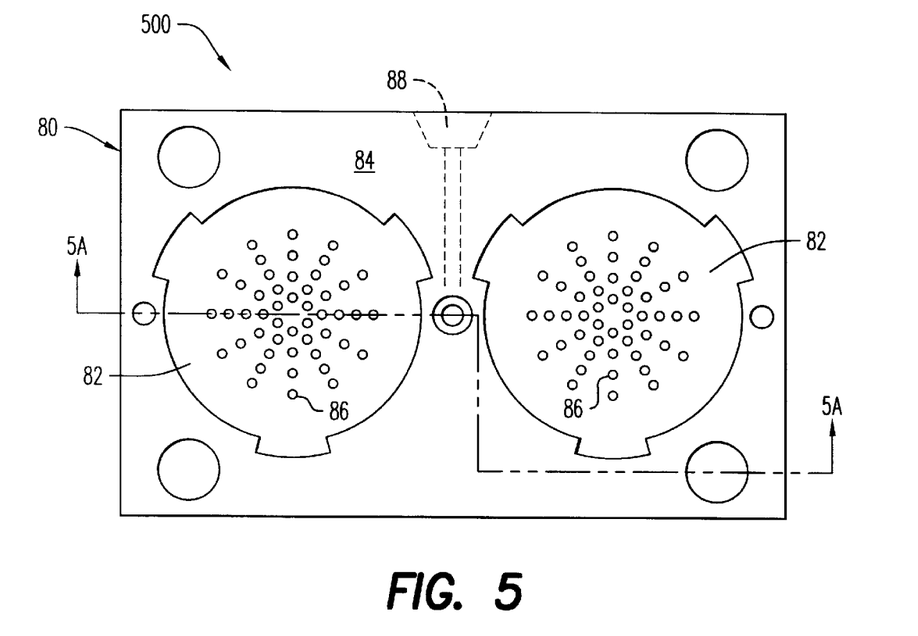
FIG. 5 is a top view of a cavity plate of the alternative die piercing assembly.
Figure 5A:
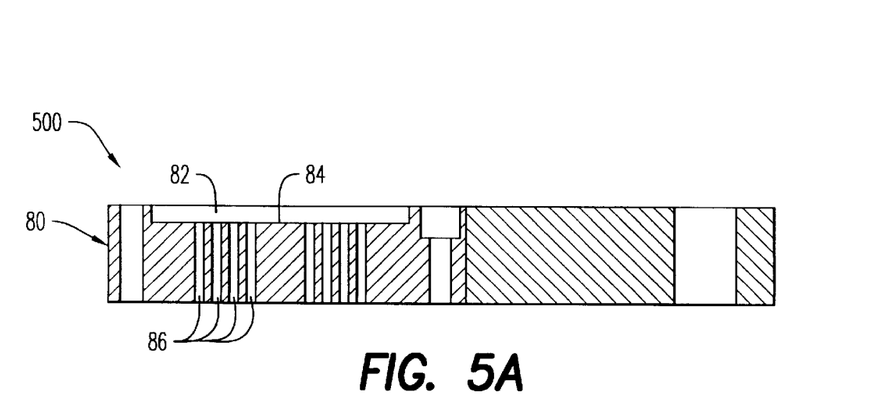
FIG. 5A is a vertical sectional view taken along line 5A—5A of the cavity plate of FIG. 4.

FIGS. 5 through 8A show an alternative embodiment of the piercing die assembly of the present invention for forming slits 18 in vent discs 10. More particularly, FIGS. 5 and 5A show a cavity plate 80 of the die assembly, here generally referred to by reference numeral 500, preferably fixed and having dual out cavities 82 whose geometrical outline corresponds to that of vent disc 10. Cavities 82 have a flat bottom surface 84. Communicating with bottom surface 84 is a plurality of vacuum channels 86 that are arranged in the starburst pattern of vent disc 10 and are connected through a pipe 88 to means for pulling a vacuum (not shown).

Figure 6:
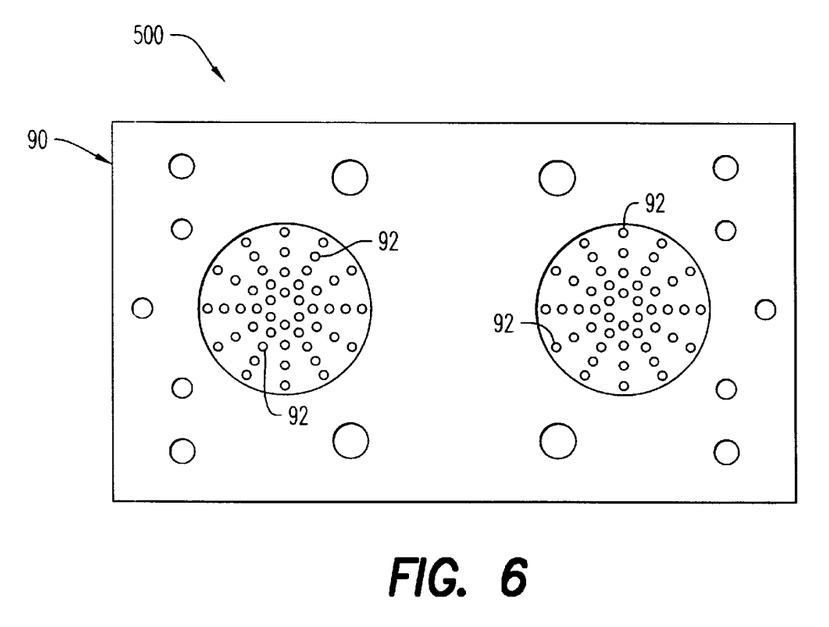
FIG. 6 is a top view of the stripper plate of the alternative die piercing assembly.

FIG. 6 shows a stripper plate 90 having slots 92 extending vertically therethrough. Slots 92 are arranged in the starburst pattern of slits 18 of vent disc 10. Stripper plate 90 is vertically aligned with and vertically reciprocally mounted on top of cavity plate 80.

Figure 7:
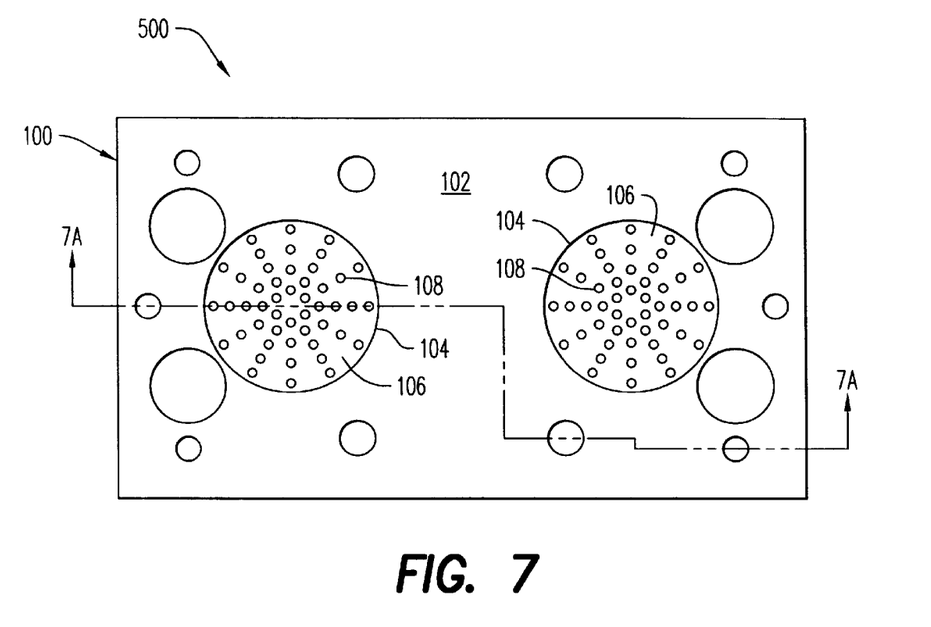
FIG. 7 is a top view of the punch retainer plate of the alternative die piercing assembly.
Figure 7A:
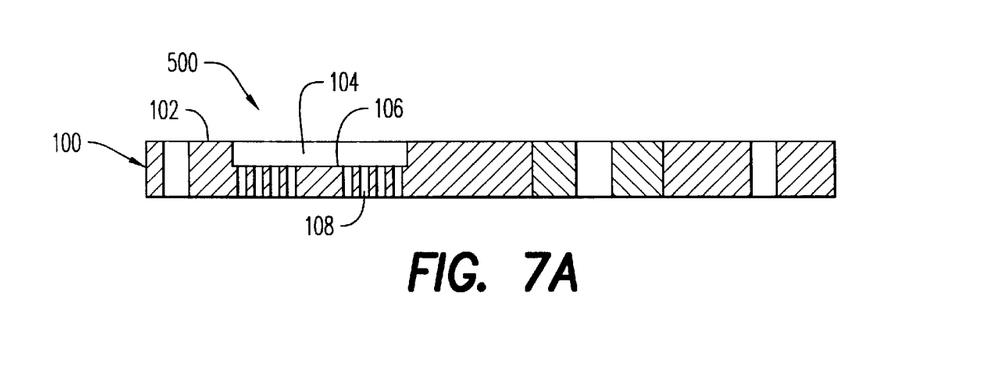
FIG. 7A is a vertical section view taken along line 7A—7A through the punch retainer plate of FIG. 7.

FIGS. 7 and 7A show a retainer plate 100 having a top surface 102 with cylindrical cut out 104 formed vertically therein and having a bottom surface 106 that communicates with a plurality of slots 108 arranged in the starburst pattern of slits 18 of vent disc 10. Retainer plate 100 is vertically aligned with and vertically reciprocally mounted on top of stripper plate 90.

Figure 8:
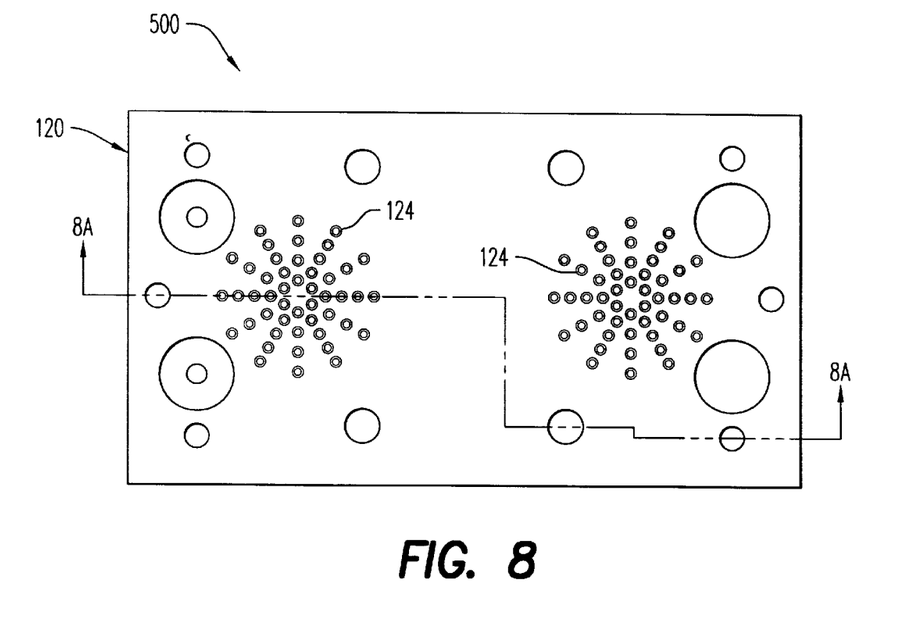
FIG. 8 is a top view of the punch mounting plate of the alternative die piercing assembly.
Figure 8A:
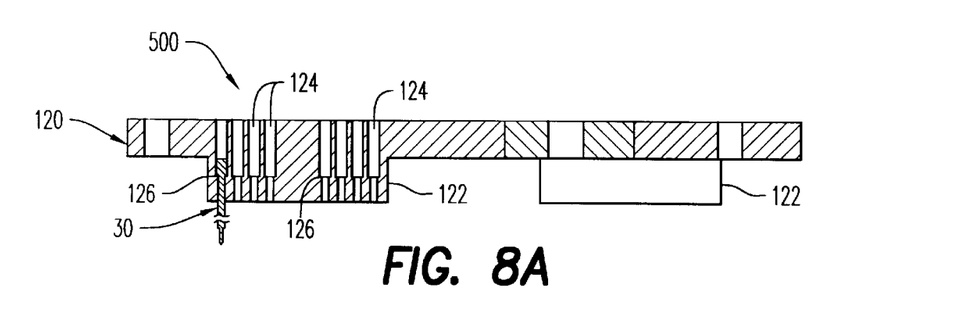
FIG. 8A is a vertical section view taken along line 8A—8A through the punch mounting plate of FIG. 8.

FIGS. 8 and 8A show a piercing element or punch mounting plate 120 having a vertically depending cylindrical plate portion 122, and a plurality of piercing element or punch mounting holes 124 arranged in the starburst pattern of slits 18 of vent disc 10. Holes 124 extend vertically through plate 120 and plate portion 122, and have a radially inwardly extending annular seat 126 for seating and supporting the bases 32 of inverted piercing elements 30 thereon. Holes 124 are dimensioned to frictionally hold, preferably tightly, and prevent piercing elements 30 from moving axially therein. Punch mounting plate 120 is vertically aligned with and vertically reciprocally spring mounted on top of punch retainer plate 100. A coil or other suitable spring (not shown) is concentrically mounted axially on the vertical shafts (not shown) reciprocally connecting punch mounting plate 120 and punch retainer plate 100. Thus, these plates function and often move together.

Die piercing assembly 500 operates as follows. An unpierced vent disc 10 is circumferentially aligned with and placed right-side-up in cavity 82 of cavity plate 80, and a vacuum is pulled through vacuum channels 86. The vacuum draws or pulls central panel 12 from its domed shape to a flat disposition against cavity bottom surface 84. Stripper plate 90 is then lowered onto cavity plate 80 and onto flattened vent disc 10 in cavity 82. Stripper plate contacts vent disc 10 and assists to maintain its central panel 12 flat against cavity bottom surface 84. Punch mounting plate 120 with piercing elements 30 mounted invertedly in mounting holes 124, is brought vertically down onto stripper plate 90 thereby moving shafts 33 of piercing elements 30 in and through respective aligned retainer plate slots 108 and stripper plate slots 92. Punch mounting plate 120 is moved further downward so that blades 34 of piercing elements 30 pierce or slit completely through residual 24 of central panel 12, and the tips of blades 34 override and enter aligned vacuum channels 86 of underlying cavity plate 80. Thus, in piercing die assembly 500, central panel 12 is flat when it is pierced by piercing elements 30 that are mounted axially, and vertical and parallel to each other in punch mounting plate 120.

When piercing is completed and slits 18 are formed, punch mounting plate 120 is raised vertically until piercing elements 30 are fully removed from retainer plate slots 108. While it is being raised, the coil spring (not shown) positioned vertically between punch mounting plate 120 and stripper plate 90 biases and maintains stripper plate down against pierced vent disc 10. Thus, stripper plate 90 retains the vent disc 10 in place while blades 34 of piercing elements 30 are removed or stripped from slits 18. Once vent disc 10 is stripped from piercing element blades 34, retainer plate 100 and punch mounting plate 120 are together raised to free pierced vent disc 10 for removal from cavity plate 80. Once central panel 12 is free of retainer plate 100 or removed from cavity plate 80, it returns to its domed disposition. Thus, alternative die assembly 500 forms vertical parallel slits 18 with vertically disposed parallel piercing elements, while central panel 12 is flat. As in the case of piercing die assembly 50, piercing of vent disc 30 is effected in a direction perpendicular to the surface of central panel 12 being pierced. Once central panel 12 returns to its domed disposition, substantially all of slits 18 are at an angle to the vertical, as they would be formed with piercing die assembly 50.

Of the preferred apparatus of the present invention, die piercing assembly 50 is preferred because it has less parts and is more simple in design and operation. However, die assembly 500 may be preferred for certain applications, for example, if the juxtaposed surfaces of slit 18 tend to stick to cutting blade surfaces 36 of piercing element 30 and prevent clean and easy stripping of the blades from the vent discs. For those applications, die assembly 500 may be preferred because it employs stripper plate 90 that holds vent discs 10 in place while blades 34 are removed from the vent discs.

Figure 9:
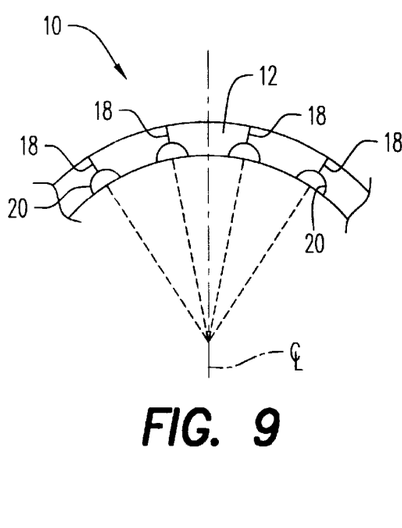
FIG. 9 is an enlarged schematic vertical sectional view, with portions broken away, of a portion of the central panel of the vent disc of FIG. 1.

As shown in FIG. 9, in accordance with the invention, each die piercing assembly 50, 500 operates to effect perforations or slits 18, in vent disc 10 in a direction perpendicular to the surface to be pierced. Each piercing assembly 50, 500 forms a substantial number of slits 18 that are disposed at an angle to the longitudinal axis or center line CL of vent disc 10. Of course, slits 18 formed in the central portion of the dome will be close to perpendicular or perpendicular to central panel 12 and close to parallel or parallel to center line CL. Slits 18 formed increasingly further out on the radii of the starburst pattern of slits 98 will be at increasingly greater angles relative to center line CL.

Figure 10:
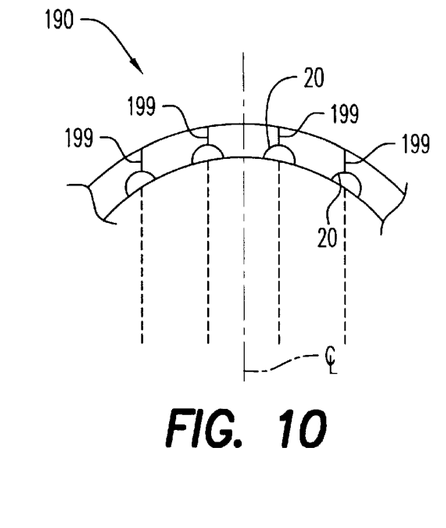
FIG. 10 is an enlarged schematic vertical sectional view, with portions broken away, of a portion of the central panel of a vent disc that is not perforated in accordance with a die piercing assembly of the present invention.

FIG. 10 shows a vent disc 190 having slits 199 formed on lines on or parallel to center line CL. Therefore, most of slits 199 are formed in a direction that is at an angle to the surface to be pierced.

Domed vent discs 10 of the present invention having slits 18 formed perpendicular to the surface being pierced in accordance with the method and apparatus of the invention (as in FIG. 9) are believed to vent air and liquid more effectively than domed vent discs whose slits are formed at an angle to the surface being pierced (as in FIG. 10). The former slits 18 have a shorter height or depth. Therefore, there is a shorter distance for the air or liquid being vented to pass through the slit and the central panel. Also, there is less contact area between juxtaposed surfaces of these slits 18. Consequently, slits 18 open and close more easily. Further, less slit surface contact area may reduce sticking of slit surfaces to blades 34 of piercing elements 30.

Two preferred piercing die assemblies 50, 500 are disclosed. Each piercing assembly 50, 500 operate differently. However, each effects the preferred method of piercing a vent disc, i.e., in a direction perpendicular to the surface to be pierced. In addition, in the preferred embodiments of the assemblies, the piercing elements are spring loaded.

Having thus described the vent disc, methods and apparatus of the present invention with particular reference to preferred embodiments thereof, it will be apparent that various changes and modifications may be made therein without departing from the spirit and scope of the invention as defined in the appended claims.

What is claimed is:

1. A vent disc for a drinking container, which comprises:
   a curved domed portion, said domed portion having a plurality of perforations extending therethrough, said plurality of perforations extending along radii that form the curvature of said domed portion, wherein said plurality of perforations have at least two different diameters through said domed portion.

2. A vent disc for a drinking container, which comprises:
   a concavely curved domed central panel having a plurality of upwardly extending depressions therein;
   a plurality of residuals of said central panel above said plurality of depressions; and
   a plurality of perforations extending through said plurality of residuals,
   wherein said plurality of depressions have center lines that are coincident with radii of curvature that form the concave curvature of said domed central panel, and
   wherein said plurality of perforations extend along said center lines of said plurality of depressions.

3. The vent disc of claim 2, wherein the vent disc is made of a polymeric or thermoset material.

4. The vent disc of claim 3, wherein the material is selected from the group consisting essentially of a thermoplastic, elastomer, thermoset rubber, silicone and combinations thereof.

5. The vent disc of claim 2, wherein the vent disc has a hardness of about 45 durometers.

6. The vent disc of claim 2, wherein said central panel has a thickness of; about 0.03 inches to about 0.10 inches.

7. The vent disc of claim 6, wherein said central panel has a thickness of; about 0.050 to about 0.060 inches.

8. The vent disc of claim 2, wherein a majority of said plurality of depressions each has a diameter of about 0.060 inches.

9. The vent disc of claim 2, wherein said plurality of depressions has a shape selected from the group consisting essentially of conical and cylindrical shapes.

10. The vent disc of claim 2, wherein a majority of each of said plurality of residuals has a thickness about 0.010 to about 0.090 inches.

11. The vent disc of claim 10, wherein each of said majority of said plurality of residuals has a thickness of about 0.030 inches.

12. The vent disc of claim 2, wherein said plurality of perforations have a width about 0.040 to about 0.080 inches.

13. The vent disc of claim 12, wherein said width of said plurality of perforations is about 0.060 inches.

14. A vent disc for a drinking container, which comprises:
   a curved domed portion, said domed portion having an undersurface, a top surface, a plurality of depressions extending upwardly into said undersurface, and a plurality of slits extending from said top surface to said depressions along radii that form the curvature of said domed portion.

15. A vent disc for a drinking container, which comprises:
   a concavely curved domed central panel having a plurality of upwardly extending depressions therein;
   a plurality of residuals of said central panel above said plurality of depressions; and
   a plurality of slits extending through said plurality of residuals,
   wherein said plurality of depressions have center lines that are coincident with radii of curvature that form the concave curvature of said domed central panel, and
   wherein said plurality of slits extend along said center lines of said plurality of depressions.

16. The vent disc of claim 15, wherein the vent disc is made of a material selected from the group consisting essentially of a thermoplastic, elastomer, thermoset rubber, silicone and combinations thereof.

17. The vent disc of claim 15, wherein said central panel has a thickness of about 0.03 inches to about 0.10 inches.

18. The vent disc of claim 17, wherein said central panel has a thickness of about 0.050 to about 0.060 inches.

19. The vent disc of claim 15, wherein each of said plurality of depressions has a shape selected from the group consisting essentially of conical and cylindrical shapes.

20. The vent disc of claim 15, wherein a majority of each of said plurality of residuals has a thickness about 0.010 to about 0.090 inches.

21. The vent disc of claim 20, wherein a majority of each of said plurality of residuals has a thickness about 0.025 to about 0.035 inches.

22. The vent disc of claim 20, wherein each of said majority of said plurality of residuals has a thickness of about 0.030 inches.

23. The vent disc of claim 15, wherein said plurality of slits have a width of about 0.040 to about 0.080 inches.

24. The vent disc of claim 15, wherein said plurality of slits have a width of about 0.058 to about 0.062 inches.

25. The vent disc of claim 15, wherein said plurality of slits have a width of about 0.060 inches.

26. The vent disc of claim 15, wherein said slits extend through the thinnest portion of said residuals.

27. The vent disc of claim 15, wherein there are from about 37 to about 60 of said slits in said central panel.

28. The vent disc of claim 15, wherein there are from about 48 to about 60 of said slits in said central panel.

29. The vent disc of claim 15, wherein there are 48 of said slits overlying 48 of said depressions in said central panel, and said slits and depressions are arranged in a starburst pattern having a series of 12 radial extensions equally circumferentially angularly spaced about 30 degrees from each other, each extension having four equally spaced slits and underlying depressions.

30. The vent disc of claim 15, wherein the vent disc has a hardness of about 45 durometers.

31. The vent disc of claim 15, wherein a majority of said plurality of depressions has a diameter of about 0.060 inches.

32. A vent disc for a drinking container, which comprises:
   a concavely curved domed central panel having a plurality of upwardly extending domed depressions therein;
   a plurality of residuals of said central panel above said plurality of depressions; and
   a plurality of slits extending through said plurality of residuals,
   wherein said plurality of depressions have center lines that are coincident with radii of curvature that form the concave curvature of said domed central panel, and
   wherein said plurality of slits extend along said center lines of said plurality of depressions such that said respective slits are perpendicular to the respective surfaces of said domes of said depressions that are slit.

33. The vent disc of claim 25, wherein said slits extend through the thinnest portions of said residuals.

* * * * *